(12) United States Patent
Zhang et al.

(10) Patent No.: US 8,335,167 B1
(45) Date of Patent: Dec. 18, 2012

(54) REFINING BEAMFORMING TECHNIQUES FOR PHASED-ARRAY ANTENNAS

(75) Inventors: Hongyuan Zhang, Fremont, CA (US); Hui-Ling Lou, Sunnyvale, CA (US); Yong Liu, Santa Clara, CA (US); Songping Wu, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 376 days.

(21) Appl. No.: 12/698,810

(22) Filed: Feb. 2, 2010

Related U.S. Application Data (60) Provisional application No. 61/149,186, filed on Feb. 2, 2009.

(51) Int. Cl.
*H04B 7/00* (2006.01)

(52) U.S. Cl. .......................................... 370/252; 455/69

(58) Field of Classification Search .................. 370/252; 455/69; 342/367
See application file for complete search history.

(56) References Cited

U.S. PATENT DOCUMENTS

| | | | |
|---|---|---|---|
| 7,406,337 B2 * | 7/2008 | Kim et al. ................... | 455/562.1 |
| 7,710,319 B2 * | 5/2010 | Nassiri-Toussi et al. ...... | 342/377 |
| 7,953,176 B2 * | 5/2011 | Roh .............. | 375/295 |
| 8,040,278 B2 * | 10/2011 | Maltsev et al. ............... | 342/378 |
| 8,095,097 B1 * | 1/2012 | Nabar et al. ................ | 455/179.1 |
| 8,184,052 B1 * | 5/2012 | Wu et al. ................. | 342/368 |
| 2006/0270360 A1 * | 11/2006 | Han et al. ......................... | 455/69 |
| 2007/0099571 A1 | 5/2007 | Withers et al. | |
| 2008/0254752 A1 * | 10/2008 | Oh et al. ......................... | 455/83 |
| 2009/0160707 A1 * | 6/2009 | Lakkis .......................... | 342/367 |
| 2010/0111215 A1 * | 5/2010 | Nandagopalan et al. ...... | 375/267 |
| 2010/0284495 A1 * | 11/2010 | Segal et al. .................... | 375/316 |
| 2011/0045785 A1 * | 2/2011 | Sutskover et al. .............. | 455/69 |

FOREIGN PATENT DOCUMENTS

WO WO-99/65160 A1 12/1999

OTHER PUBLICATIONS

U.S. Appl. No. 12/548,393, filed Aug. 26, 2009, Zhang et al.
IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.
IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2009).

(Continued)

*Primary Examiner* — Min Jung (57) ABSTRACT

Refining beamforming techniques for use in a communication system. In one embodiment, a method for beamforming in a communication system includes generating multiple training signals to be transmitted via multiple antennas over a communication channel, including applying a different antenna weight vector (AWV) to each of the multiple training signals. The method further includes receiving feedback generated using the multiple training signals, where the feedback includes a transmitter AWV for use with the multiple antennas and/or channel state information (CSI) descriptive of the communication channel.

15 Claims, 8 Drawing Sheets

OTHER PUBLICATIONS

K. McCabe, "IEEE 802.15.3™ Guide Addresses Untapped High-Rate Wireless Personal Area network (WPAN) Market," *The Institute of Electrical and Electronics Engineers, Inc.*, May 18, 2004.

Myung-Hoon Yeon, et al., "Enhanced adaptive antenna algorithms for asynchronous TDMA systems", Information Sciences and Systems, pp. 990-993 (2008).

Partial International Search report for International Application No. PCT/US2009/055071, dated Mar. 12, 2009.

S. A. Mujtaba, "IEEE P802.11—Wireless LANS, TGn Sync Proposal Technical Specification," *The Institute of Electrical and Electronics Engineers, Inc.*, doc.: IEEE 802.11-04/0889r6 (2005).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

Wylie-Green et al., "Multi-band OFDM UWB solution for IEEE 802.15.3a WPANs," *The Institute of Electrical and Electronics Engineers, Inc.* Apr. 2005.

* cited by examiner

REFINING BEAMFORMING TECHNIQUES FOR PHASED-ARRAY ANTENNAS

RELATED APPLICATION

This application claims the benefit of U.S. Provisional Patent App. No. 61/149,186 entitled "Explicit Beamforming in 60 GHz Wireless," filed Feb. 2, 2009, the disclosure of which is hereby expressly incorporated herein by reference.

FIELD OF THE TECHNOLOGY

The disclosure relates generally to wireless communication systems and, more particularly, to refining beamforming techniques.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technology is described in detail in several IEEE standards documents, including for example, the IEEE Standard 802.11b (1999) and its updates and amendments, the IEEE Standard 802.11n, as well as the IEEE 802.15.3 Standard (2003) and the IEEE 802.15.3c Draft D0.0 Standard, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a or the IEEE Standard 802.11n. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

As is known, antennas and, accordingly, associated effective wireless channels are highly directional at frequencies near or above 60 GHz. In general, path loss on a wireless communication link may be partially determined by such operational parameters as carrier frequencies and distances between communicating devices, and may be further affected by shadowing effects along transmission paths, channel fading due to reflection, scattering, oxygen absorption, etc., and other environmental factors. As a result, link budget (i.e., the aggregate of gains and losses associated with a communication channel) is frequently subject to a significant path loss.

When multiple antennas are available at a transmitter, a receiver, or both, it is therefore important to apply efficient beam patterns to the antennas to better exploit spatial selectivity and improve the link budget of the corresponding wireless channel. Generally speaking, beamforming or beam-steering creates a spatial gain pattern having one or more high gain lobes or beams (as compared to the gain obtained by an omni-directional antenna) in one or more particular directions, with reduced the gain in other directions. If the gain pattern for multiple transmit antennas, for example, is configured to produce a high gain lobe in the direction of a receiver, better transmission reliability can be obtained over that obtained with an omni-directional transmission. In addition to providing better link reliability, beamforming can greatly reduce the amount of power dissipated by transmitting devices. More specifically, beamforming allows a transmitting device to focus the transmission power in a particular direction when transmitting data to one or several receiving devices.

Example beamforming techniques are described in commonly-owned, co-pending U.S. patent application Ser. No. 12/548,393, filed on Aug. 26, 2009, and entitled "Beamforming by Sector Sweeping," which is hereby expressly incorporated by reference herein, and in the commonly-owned, co-pending U.S. patent application Ser. No. 12/562,782, filed entitled "A New Digital Beamforming Scheme for Phased-Array Antennas," filed on Sep. 19, 2009, also expressly incorporated by reference herein.

SUMMARY

The present disclosure provides methods and apparatus for beamforming in a communication system.

In one embodiment, a method for beamforming in a communication system includes generating multiple training signals to be transmitted via multiple antennas over a communication channel, including applying a different antenna weight vector (AWV) to each of the multiple training signals. The method further includes receiving feedback generated using the multiple training signals, where the feedback includes a transmitter AWV for use with the multiple antennas and/or channel state information (CSI) descriptive of the communication channel.

In another embodiment, a method for beamforming in a communication system includes receiving multiple training signals transmitted from a transmitting device over a communication channel, where each of the multiple training signals corresponds to a different transmit antenna weight vector (AWV). The method further includes generating feedback to be transmitted to the transmitting device using the multiple training signals, wherein the feedback includes a transmitter AWV for use by the transmitting device and/or channel state information (CSI) descriptive of the communication channel.

In another embodiment, an apparatus includes a beamforming controller and a feedback processing unit. The beamforming controller is configured to generate multiple training signals to be transmitted via multiple antennas over a communication channel, including applying a different antenna weight vector (AWV) to each of the multiple training signals. The a feedback processing unit is configured to receive feedback generated using the multiple training signals, where the feedback includes a transmitter AWV for use with the multiple antennas and/or channel state information (CSI) descriptive of the communication channel.

DETAILED DESCRIPTION

Figure 1A:
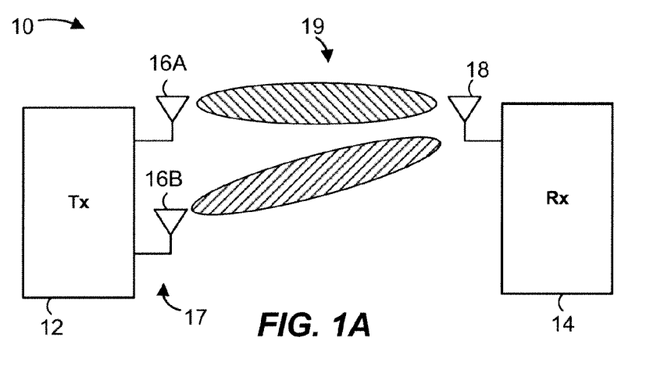
FIG. 1A is a block diagram of a communication system including a transmitter having multiple antennas and a receiver having a single antenna.
Figure 1B:
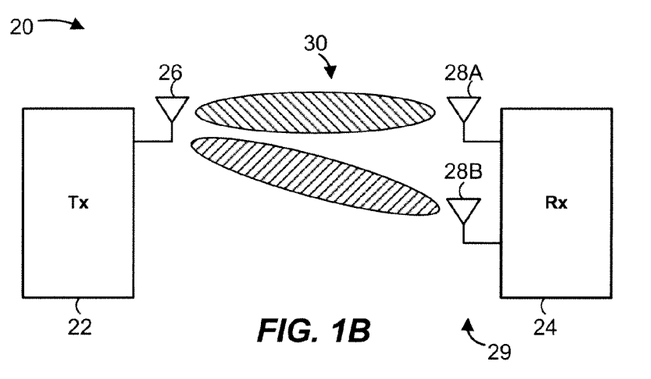
FIG. 1B is a block diagram of a communication system including a transmitter having a single antenna and a receiver having multiple antennas.
Figure 1C:
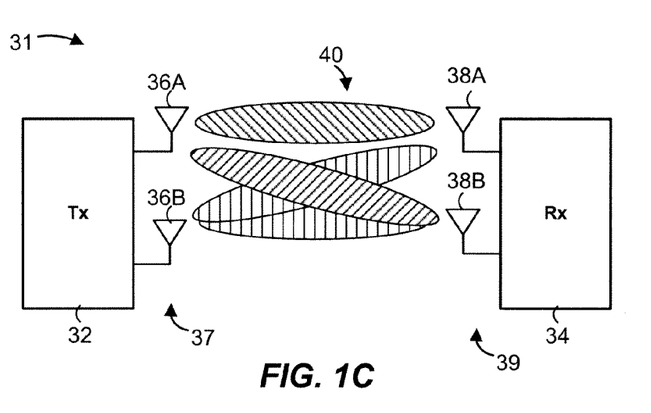
FIG. 1C is a block diagram of a communication system including a transmitter having multiple antennas and a receiver having multiple antennas.

FIGS. 1A-1C are block diagrams of several examples of communication systems that have refining beamforming capabilities. For simplicity, FIGS. 1A-1C illustrate systems in which only two devices are communicating with each other. However, as described further below, a system can also include more than two devices, and one device can communicate with several other devices. In any event, FIG. 1A illustrates a wireless communication system 10 in which a station or transmitting device 12 transmits information over a wireless communication channel to another station or receiving device 14. In an embodiment, the transmitted information is in the form of one or more data units (e.g. packets, frames, etc). Each of the devices 12 and 14 is, for example, a fixed station, such as a base station, personal computer, etc., or a mobile station such as a mobile phone, a personal digital assistant, etc. In the example of FIG. 1A, the transmitting device 12 is equipped with two or more antennas 16 defining an antenna array 17, while the receiving device 14 is equipped with a single antenna 18. The wireless communication system 10 is thus a multiple input, single output (MISO) system. For the purposes of simplicity and conciseness, the transmitting device 12 is illustrated with only two antennas 16A and 16B. However, it will be noted that the transmitting device 12 can generally have any desired number of antennas.

During transmission, the transmitting device 12 controls the phase and/or amplitude of a signal at each of the antennas 16A and 16B to define a radiation or gain pattern 19. Specifically with respect to controlling phases, the transmitting device 12 selects a steering vector (or "phasor") that specifies a set of phase shifting angles, and applies the steering vector to the antenna array 17 to thereby define a phased antenna array. The steering vector can specify a 0° phase shift for the antenna 16A and a 35° phase shift for the antenna 16B, for example. In this manner, the steering vector defines a direction of transmission or reception of the antenna array 17 that may be referred to as a "sector."

Similarly, a wireless communication system 20 (see FIG. 1B) is a single input, multiple output (SIMO) system that includes a station or transmitter 22 and a station or receiver 24, with the transmitter 22 having a single antenna 26 and the receiver 24 having multiple antennas 28 arranged in an antenna array 29. The transmitter 22 transmits a signal to the receiver 24 via the single antenna 26, and the receiver defines a gain pattern 30 by controlling phase shifting angles at the antennas 28A-28B using a corresponding steering vector.

Meanwhile, a wireless communication system 31 illustrated in FIG. 1C is a multiple input, multiple output (MIMO) system in which each of a station or transmitter 32 and a station or receiver 34 is equipped with multiple antennas (antennas 36A-36B defining an antenna array 37, and antennas 38A-38B defining an antenna array 39). Each of the transmitter 32 and the receiver 34 can apply steering vectors to the respective antenna array 36 or 38 to define gain patterns 40.

Generally speaking, a station equipped with multiple antennas and operating in a MIMO environment (or in one of degenerate forms of MIMO such as SIMO or MISO) may use a transmit steering vector v to define a gain pattern when transmitting outbound data and a receive steering vector u to define a gain pattern when receiving inbound data. By extension, when a pair of multi-antenna devices (e.g., devices 32 and 34) exchange data in both directions, these devices may define steering vectors $v^1$, $u^1$, $v^2$, and $u^2$. Further, an antenna array may sometimes operate in an omni receive pattern mode or quasi-omni receive pattern mode (i.e., closely approximating the omni mode) $omni_{RX}$ in which the antenna array does not reinforce or suppress power of signals from any particular direction, or in an omni or quasi-omni transmit pattern mode $omni_{TX}$ in which the antenna array does not reinforce or suppress power of transmitted signals in any particular direction. For the purposes of conciseness, both omni and quasi-omni modes are referred to as "omni" modes below.

Figure 2A:
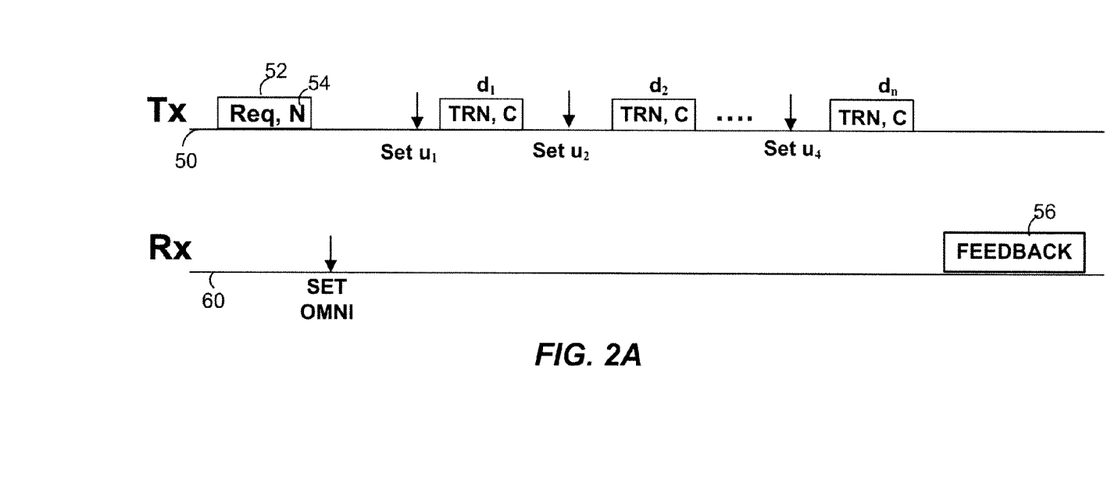
FIG. 2A is a timing diagram that illustrates using transmit beamforming training to select a transmit steering vector.
Figure 2B:
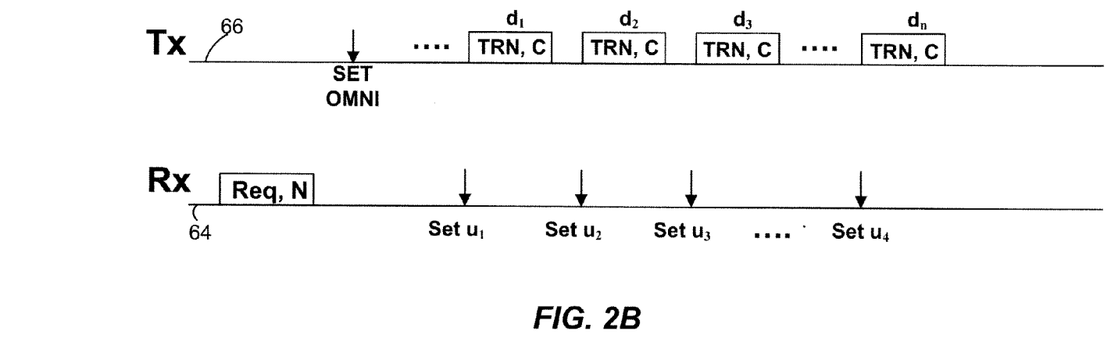
FIG. 2B is a timing diagram that illustrates using receive beamforming training to select a receive steering vector.

FIGS. 2A-2B are timing diagrams that illustrate data transmitted during a beamforming training session between a multi-antenna station 50 (Tx) and another station 60 (Rx), according to an embodiment. FIG. 2A illustrates using transmit beamforming training to select a transmit steering vector. The station 50 includes two or more antennas, whereas the station 60 may include one or more antennas. To identify a suitable (e.g., an efficient or, at least, a relatively good) transmit steering vector v, the multi-antenna station 50 iteratively applies a series of transmit steering vectors $v_1, v_2, \ldots v_n$ to the antenna array of the station 50 and transmits respective training data units (e.g., packets, frames, etc.) $d_1, d_2, \ldots d_n$ via the antenna array for the transmit steering vectors $v_1, v_2, \ldots v_n$. Thus, each of the training data units $d_1, d_2, \ldots d_n$ corresponds to one of the transmit steering vectors $v_1, v_2, \ldots v_n$ (e.g., $d_1$ corresponds to $v_1$, $d_2$ corresponds to $v_2$, etc.) In an embodiment, the peer station 60 receives the training data units $d_1, d_2, \ldots d_n$ using the same receive steering vector (or an omni or quasi-omni transmit pattern mode, a single antenna, etc.) so as to assess the quality of received data units $d_1, d_2, \ldots d_n$ in view of the parameters of only the transmitting antenna array of the transmitting station 50.

In an embodiment, prior to transmitting the training data units $d_1, d_2, \ldots d_n$, the station 50 transmits a request message 52 to the station 60 to request that the peer station 60 begin receiving the series of data units $d_1, d_2, \ldots d_n$. As illustrated in FIG. 2A, the request message 52, in an embodiment, includes a count 54 that specifies the number N of data units in the sequence $d_1, d_2, \ldots d_n$. Following the communication of the N data units, the station 60 assesses the quality of each received data unit $d_1, d_2, \ldots d_n$ using any desired technique and transmits a feedback message 56 to the station 50. The station 50 may then select or generate a transmit steering vector v from or based on the feedback message 56.

FIG. 2B illustrates using receive beamforming training to select a receive steering vector. A multi-antenna station 64 identifies an efficient receive steering vector u by requesting that a peer station 66 transmit N data units $d_1, d_2, d_n$, iteratively applying a series of receive steering vectors $u_1, u_2, \ldots u_n$ to the antenna array of the station 70, and receiving all or some of training data units for some or all of the receive steering vectors $u_1, u_2, \ldots u_n$. In this sense, each of the receive steering vectors $u_1, u_2, \ldots u_n$ corresponds to one of the training data units $d_1, d_2, \ldots d_n$ (e.g., $u_1$ corresponds to $d_1$, $u_2$ corresponds to $d_2$, etc.), although some of the data units $d_1, d_2, \ldots d_n$ may not always reach the station 64. The station 64 assesses the quality of each received data unit $d_1, d_2, \ldots d_n$, using any desired technique. In an embodiment, the peer station 66 transmits the training data units $d_1, d_2, \ldots d_n$ using the same transmit steering vector so as to allow the receiving station 50 to assess the quality of received data units $d_1, d_2, \ldots d_n$ in view of the parameters of only the receiving antenna array. The station 64 then selects or generate a receive steering vector u from or based on the set of steering vectors $u_1, u_2, \ldots u_n$ based on the relative quality of received data units.

In some embodiments, the receive steering vector u does not precisely match any of the steering vectors $u_1, u_2, \ldots u_n$, and the station 64 uses the quality metrics associated with the received sequence of data units $d_1, d_2, \ldots d_n$ to extrapolate or generate the desired receive steering vector u. In other embodiments, the station 64 averages several steering vectors u (e.g., top two, top three, etc.) to generate the receive steering vector u, and this technique may be referred to as beam refining. In general, any suitable algorithm is used to generate the receive steering vector u based on the assessed quality of data units corresponding to the set $u_1, u_2, \ldots u_n$ (or a subset thereof).

Figure 3:
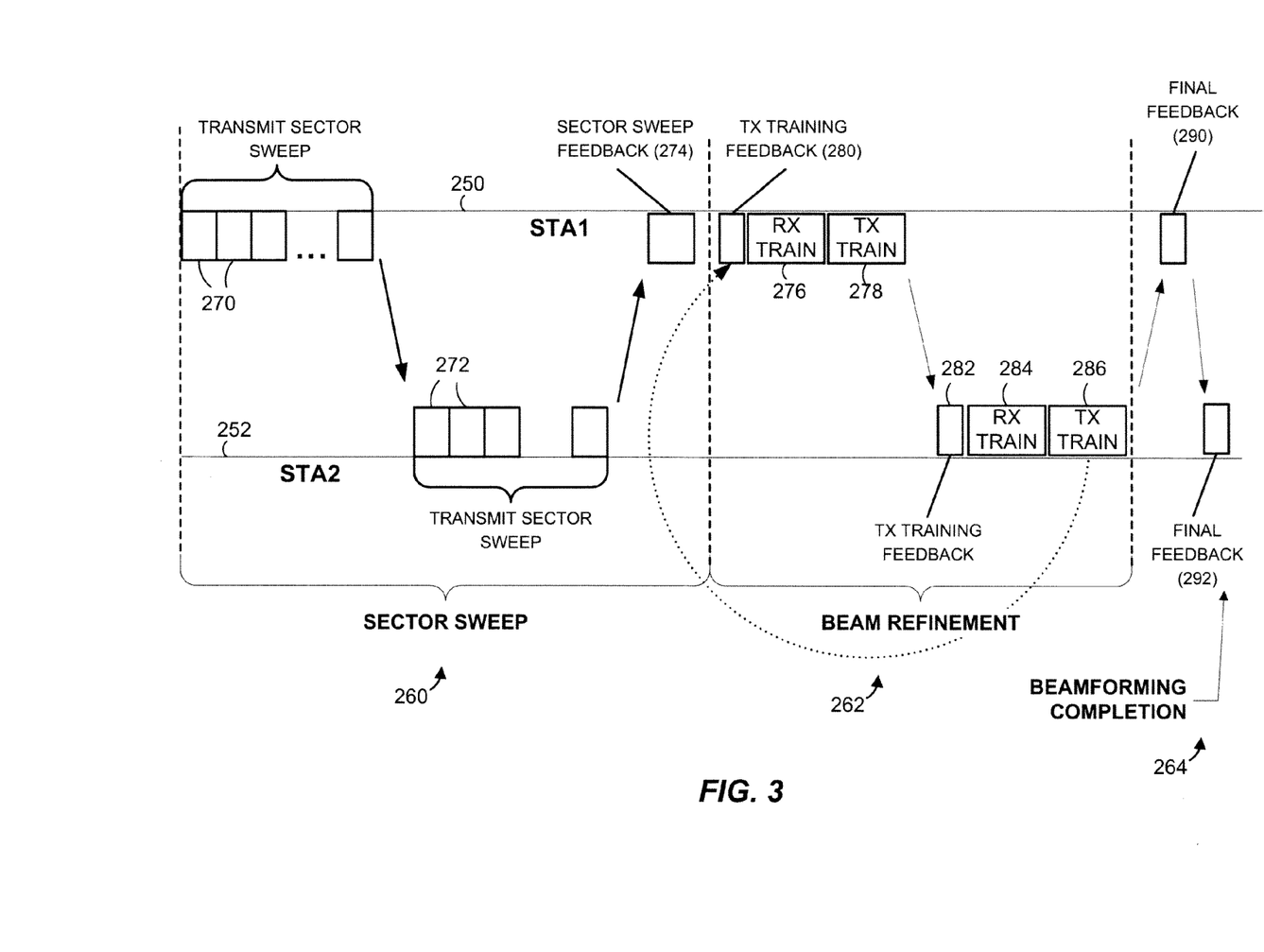
FIG. 3 is a timing diagram that illustrates a beamforming session that includes sector sweep and refining stages.

FIG. 3 is a timing diagram that illustrates an embodiment of a beamforming session that includes a sector sweep stage 260 and a beam refinement stage 262. More specifically, stations 250 and 252 exchange frames during a sector sweep beamforming stage 260, a beam refinement stage 262, and a beamforming completion stage 264. For example, frames 270 and 272 are sector sweep frames, i.e., data units used in sector sweep beamforming training. The station 250 transmits the frames 270 during transmit beamforming sector sweeping, and the station 252 transmits frames 272 during a similar session of transmit beamforming sector sweeping. In some embodiments, the frames 270 also indicate whether the station 250 supports transmit or receive beamforming sector sweeping conducted by peer devices such as the station 252.

The station 250 transmits a frame 274 to provide feedback regarding the session of transmit beamforming sector sweeping conducted by the station 252. Next, the station 250 transmits one or several frames 276 during receive beam refinement of the station 252, and one or several frames 278 during transmit beam refinement of the station 250. In an embodiment, in subsequent iterations of the beam refinement session 262, the station 250 also transmits a transmit beam refinement feedback frame 280. The station 252 transmits a frame 282 to provide feedback regarding the session of transmit beamforming sector sweeping conducted by the station 250. The station 252 then transmits one or several frames 284 during receive beam refinement of the station 250, and one or several frames 286 during transmit beam refinement of the station 252.

In FIG. 3, arrows indicate an example sequencing of the frames. Thus, the first one of the frames 272 is scheduled after the last one of the frames 270, the transmit beam refinement feedback frame 280 is scheduled following the corresponding transmit beam refinement frames 286, etc. Following the beam refinement stage 262, the station 250 transmits a final feedback frame 290, and the station 252 transmits a final feedback frame 292 to indicate that beam refinement is completed.

Figure 4:
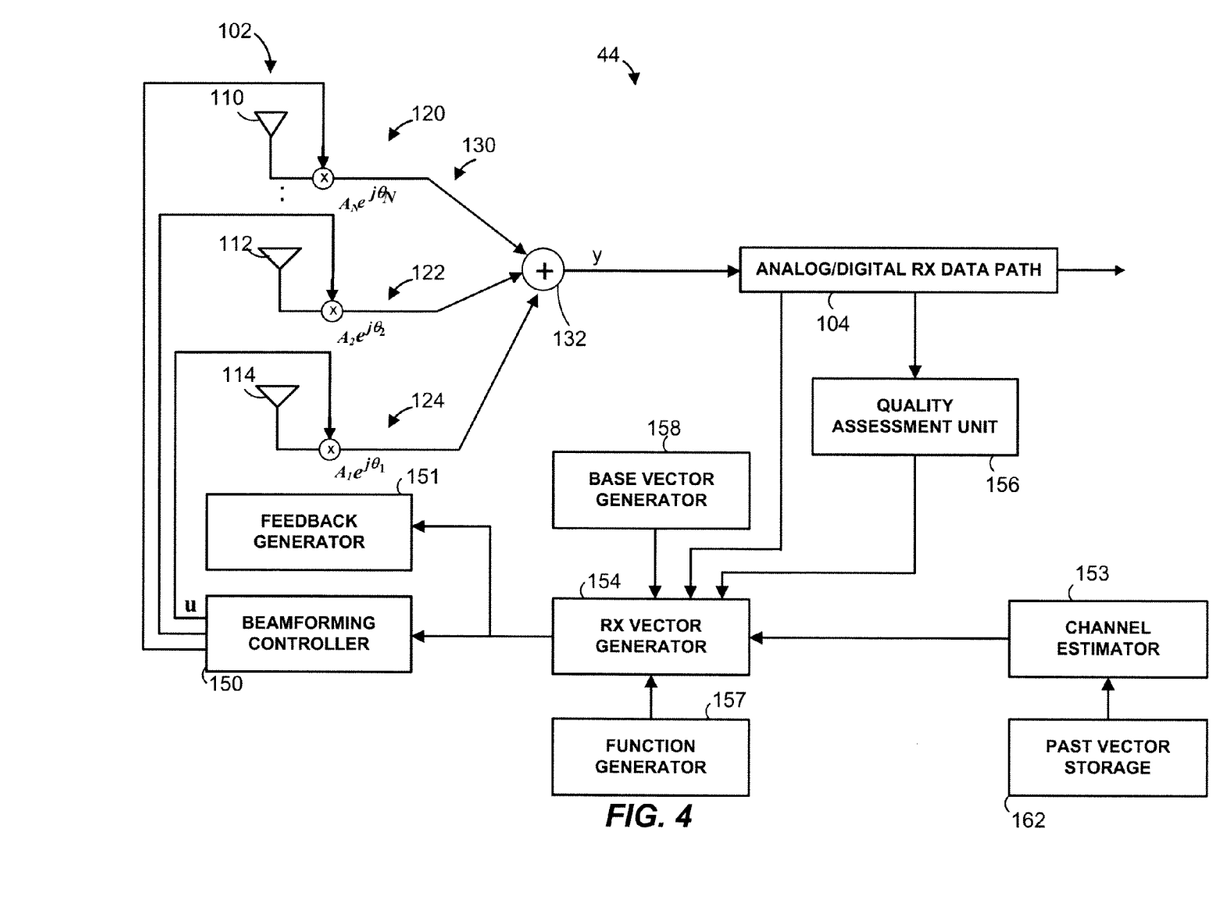
FIG. 4 is a block diagram of an example architecture of a receiving device that has refining beamforming capabilities.

FIG. 4 illustrates an example architecture of the receiving device 44 that has beamforming refining capabilities. The receiving device 44 includes an antenna array 102 connected to a shared analog/digital receiver data path 104. The antenna array 102 has $N_{rx}$ antennas including antennas 110, 112, and 114 coupled to respective delay lines 120, 122, and 124, which are controllable and which define a beamforming network 130. Each of the delay lines 120, 122, and 124 is suitable for shifting the signal received from the corresponding antenna 110, 112, or 114 by a respective phase shifting angle θ. Together, the antenna array 102 and the delay lines 120, 122, and 124 define a phased antenna array of the receiving device 44.

For ease of illustration, FIG. 4 depicts the antenna array 102 as being controllable only by assigning respective phase shift values to the antennas 110, 112, and 114. However, in other embodiments, the antenna array 102 also includes a means for controlling the amplitude of the signal received at each antenna 110, 112, or 114 such as respective amplifiers. In an embodiment, the amplifiers are complex amplifiers to adjust both amplitude and phase, or scalar amplifiers for adjusting amplitude.

The one or more phase shifting angles applied by the phased antenna array are referred to as an antenna weight vector (AWV). In embodiments in which the phased antenna array also applies amplitude weighting, the AWV also includes the amplitude weights. It is noted that although some of the examples below focus on generating efficient phase-shift-only AWVs, the techniques discussed herein also apply to AWVs that also vary amplitudes.

An adder 132 uses a suitable technique to combine the signals from the antennas 110-114, shifted by the corresponding angles $\theta_1, \theta_2, \ldots \theta_{N_{rx}}$, prior to supplying the combined received signal y to the shared analog/digital receive data path 104. In general, the analog/digital receive data path 104 includes some or all of such components as an equalizer, a decoder, a de-interleaver, a demodulator, an A/D converter, a Fast Fourier Transform (FFT) processing block, etc.

Further, the receiving device 44 includes a beamforming controller 150 and a vector selection unit 154 communicatively coupled to a quality assessment unit 156, a base vector generator 158, a channel estimator 153, and a past vector storage 162. In operation, the vector selection unit 154 supplies an AWV u or an indication of the AWV u to the beamforming controller 150. In the embodiment of FIG. 4, the AWV u specifies phase shifting angles $\theta_1, \theta_2, \ldots \theta_{N_{rx}}$ for each of the $N_{rx}$ antennas in the antenna array 102, and the beamforming controller 150 applies the angles $\theta_1, \theta_2, \ldots \theta_{N_{rx}}$ to the respective delay lines 120, 122, and 124. In other embodiments, the AWV u may specify an amplitude for each antenna, and the beamforming controller 150 applies the amplitudes to amplifiers in the delay lines 120, 122, and 124.

The base vector generator 158 supplies $N_{rx}$ AWVs $u_1, u_2 \ldots u_{N_{rx}}$ to the vector selection unit 154. More specifically, $N_{rx}$ vectors $u_1, u_2 \ldots u_{N_{rx}}$ define a complete set of base vectors of a unitary matrix U having $N_{rx}$ rows and $N_{rx}$ columns (i.e., the $N_{rx}$ vectors span the entire space of the matrix U). In some embodiments, the base vector generator 158 is a memory unit that stores the vectors $u_1, u_2 \ldots u_{N_{rx}}$. During beamforming, the vector selection unit 154 selects R vectors from the set $u_1, u_2 \ldots u_{N_{rx}}$ and supplies the selected R vectors to the beamforming controller 150 which, in turn, applies a different one of the R vectors each time a training signal is received. In some embodiments, selection of R vectors from the set $u_1, u_2 \ldots u_{Nrx}$ can be implemented at the base vector generator 158 rather than at the vector selection unit 154. Further, in certain modes of operation of the receiving device 14, $R=N_{rx}$, and the vector selection unit 154 accordingly supplies every one of the $Nr_x$ base vectors of the matrix U to the beamforming controller 150.

Additionally, when the receiving device 44 operates in the beam refinement stage (such as the beam refinement stage 262 illustrated in FIG. 3), the receiving device generally receives training signals (e.g., encapsulated in beamforming refinement packets (BRPs)), and processes the training signals to generate feedback to be transmitted to the transmitting device. The receiving device 44 applies different but orthogonal steering vectors, denoted as rows of unitary matrix Qr on the sounding subfields in the transmit signals or, more specifically, received BRPs.

In some embodiments, in a given iteration i of the refining stage, the receiving device 44 uses a channel estimator 153 to estimate the channel Hr over the receive sounding field. The channel Hr over the receive sounding field is a column vector approximately equal to HQr(i)v(i−1), where H is a MIMO channel matrix, Qr(i) is the row of a unitary matrix corresponding to the iteration i, and v(i−1) is a transmit steering vector from a previous iteration of the refining stage. Estimating the channel Hr over the receive sounding field is implemented using any of a variety of suitable techniques, including those known in the art.

Once the channel Hr over the receive sounding field is estimated, the receive steering vectors u(i) for the current iteration are calculated as a function of the channel Hr over the receive sounding field, $f_R(Hr)$. A suitable function $f_R()$, such as cophasing, codebook selection, SVD, etc., is provided by the function generator 157. Furthermore, the receiving device fixes its steering vector as u(i) and estimates the channel Ht over the transmit sounding field. The channel Ht over the transmit sounding field is a row vector approximately equal to HQt(i)u(i), where Qt(i) is the column of a unitary matrix corresponding to the iteration i. The transmit steering vectors are calculated as a function of the channel Ht over the transmit sounding field, $f_T(Ht)$. As with $f_R()$, a suitable function $f_T()$, such as cophasing, codebook selection, SVD, etc., is provided by the function generator 157. This process may be repeated for any number of iterations i, e.g., until vectors u(i) and v(i) converge.

As explained above, the receiving device 44 uses the feedback generator to transmit feedback to the transmitting device during the beam refinement stage. For example, the receiving device 44 transmits to the transmitting device a transmitter AWV, such as the calculated v(i) or an indication thereof. The receiving device 44 can also transmit to the transmitting device a channel state information (CSI) descriptive of the communication channel Ht. Additionally, the receiving device 44 can transmit to the transmitting device an indication of which of the received training signals is associated with a highest quality (e.g., based on a quality metric provided by the quality assessment unit 156).

Figure 5:
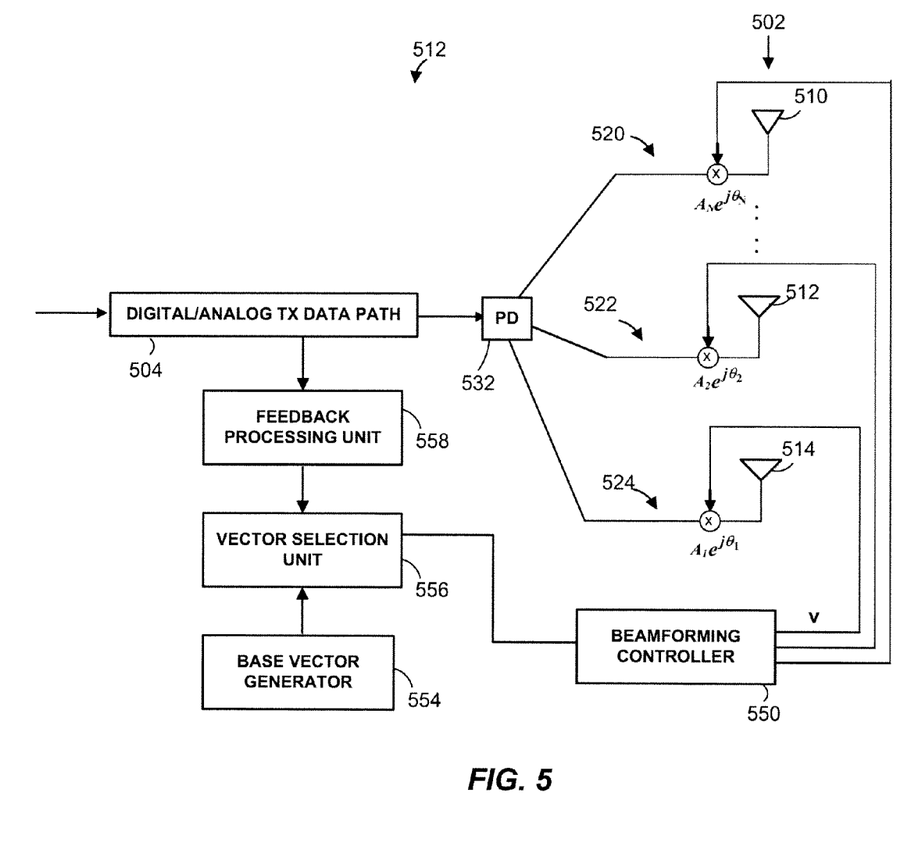
FIG. 5 is a block diagram of an example architecture of a transmitting device that has beamforming capabilities.

FIG. 5 illustrates an example architecture of the transmitting device 44 that has beamforming refining capabilities. In an embodiment, the architecture of the transmitting device 512 is similar to the architecture of the receiving device 44. Of course, a device operating in a communication system such as those illustrated in FIGS. 1A-1C typically is both a receiver and a transmitter (in respective operational states, for example). Thus, although FIGS. 4 and 5 illustrate receiver and transmitter architectures separately for the purposes of clarity, in an embodiment, a device equipped with an antenna array and adapted to communicate via a channel has a common transceiver architecture with components illustrated in FIGS. 4 and 5. For example, a transceiver device includes a common base vector generator (such as the base vector generator 558) for generating base vectors for both receive beamforming training and transmit beamforming training, a common beamforming controller (such as the beamforming controller 150) for controlling the antenna array during both receive beamforming training and transmit beamforming training, etc., as well as components specific to transmitter and receiver operations such as the reference signal storage 160 or a feedback processing unit discussed below, according to an embodiment.

Referring now to FIG. 5, the transmitting device 512, according to an embodiment, includes an antenna array 502 coupled to a shared digital/analog transmitter data path 504. The antenna array 502 has $N_{tx}$ antennas including antennas 510, 512, and 514 coupled to respective delay lines 520, 522, and 524, which are controllable and which define a beamforming network 530. Each of the delay lines 520, 522, and 524 is suitable for shifting the signal received from the corresponding antenna 510, 512, or 514 by a respective phase shifting angle θ. Together, the antenna array 502 and the delay lines 520, 522, and 524 define a phased antenna array of the transmitting device 512.

A splitter or power divider 532 supplies the signal s from the shared digital/analog transmit data path 204 to the antennas 210-214, to be shifted by the corresponding angles $θ_1, θ_2, \ldots θ_{Ntx}$ prior to transmission to the receiving device 14. As in the example illustrated in FIG. 4, the digital/analog transmit data path 204 includes some or all of such components as an equalizer, a decoder, a de-interleaver, a demodulator, an A/D converter, a Fast Fourier Transform (FFT) processing block, etc.

A vector selection unit 556 supplies an AWV v to a beamforming controller 550. Similar to the AWV u, the AWV v specifies phase shifting angles $θ_1, θ_2, \ldots θ_{Ntx}$ for each antenna in the antenna array 502, and the beamforming controller 550 applies the angles $θ_1, θ_2, \ldots θ_{Ntx}$ to the respective delay lines 520, 522, and 524. Also similar to the example illustrated in FIG. 4, a base vector generator 554 supplies $N_{tx}$ AWVs $v_1, v_2 \ldots v_{Ntx}$, defining a complete set of base vectors of a unitary matrix V, to the vector selection unit 556. During beamforming, the vector selection unit 256 selects R vectors from the set $v_1, v_2 \ldots v_{Ntx}$ and supplies the selected R vectors to the beamforming controller 550 which, in turn, applies a different one of the R vectors each time the training signal s is transmitted. In some embodiments, selection of R vectors from the set $v_1, v_2 \ldots v_{Ntx}$ is implemented at the base vector generator 254 rather than at the vector selection unit 556. Further, in certain modes of operation of the transmitting device 12, $R=N_{tx}$, and the vector selection unit 556 accordingly supplies every one of the $N_{tx}$ base vectors of the matrix V to the beamforming controller 550.

Additionally, when the transmitting device 512 operates in the beam refinement stage (such as the beam refinement stage 262 illustrated in FIG. 3), the receiving device generally transmits training signals (e.g., encapsulated beamforming refinement packet (BRPs)) to the receiving device (such as the receiving device 44 in FIG. 4) and receives and/or processes feedback (e.g., using the feedback processing unit 558) from the receiving device. The transmitting device applies different but orthogonal steering vectors, denoted as columns of unitary matrix Qt(n) on the subfields of the BRP. As explained above, the transmitting device receives a transmitter AWV, such as the calculated v(i) or an indication thereof, channel state information (CSI) descriptive of the communication channel Ht, an indication of which of the transmitted training signals is associated with a highest quality (e.g., based on a quality metric provided by the quality assessment unit).

Generally with respect to the architecture of the receiving device 44 and the transmitting device 512 illustrated in FIGS. 4 and 5 respectively, it will be noted that various ones of the modules illustrated therein can be implemented using hardware, software instructions executed by a processor, firmware instructions executed by a processor, or combinations thereof. Moreover, some of the components in FIGS. 4 and 5 may be custom integrated circuits, application-specific integration circuits (ASICs), etc., communicatively coupled by electrical busses, for example.

Figure 6A:
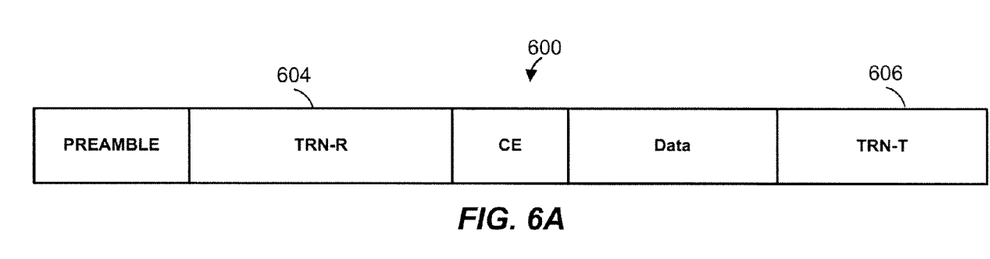
FIG. 6A is a block diagram illustrating an example beamforming refinement packet that include data indicative of both Tx training signals and Rx training signals.
Figure 6B:
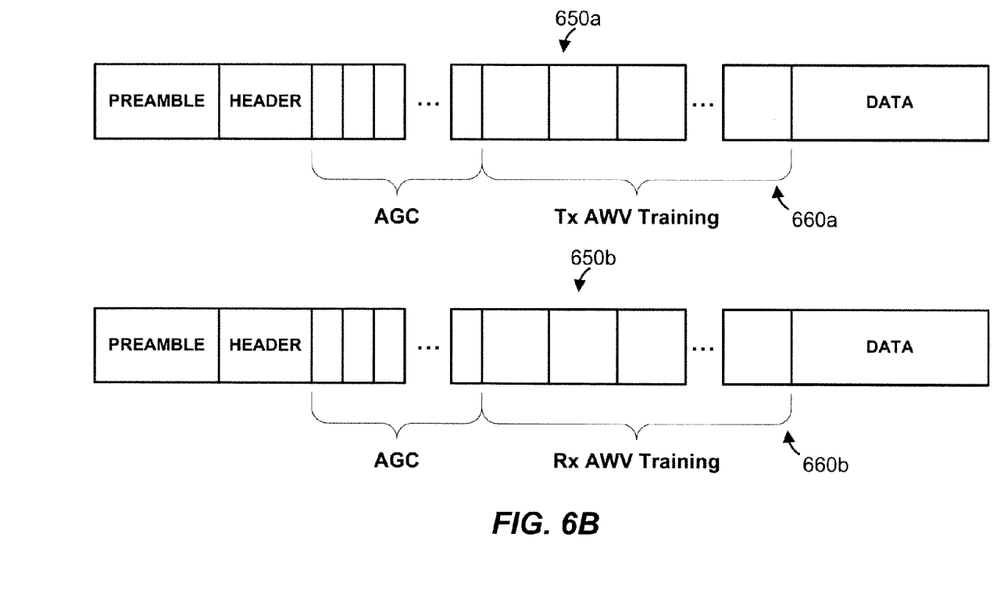
FIG. 6B is a block diagram illustrating example beamforming refinement packets that includes data indicative of Tx training signals only or Rx training signals only.

FIGS. 6A-6B are block diagrams illustrating example beamforming refinement packets BRPs 600, 650a, 650b. As illustrated in FIG. 6A, in one embodiment, data indicative of the Tx training signals, or fields 604 and data indicative of the Rx training signals, or fields 606 are included in the same BRP 600. As illustrated in FIG. 6B, in another embodiment, data indicative of the Tx training signals, or fields 660a and data indicative of the Rx training signals, or fields 660b are included in separate BRPs 650a, 660b, respectively.

Figure 7:
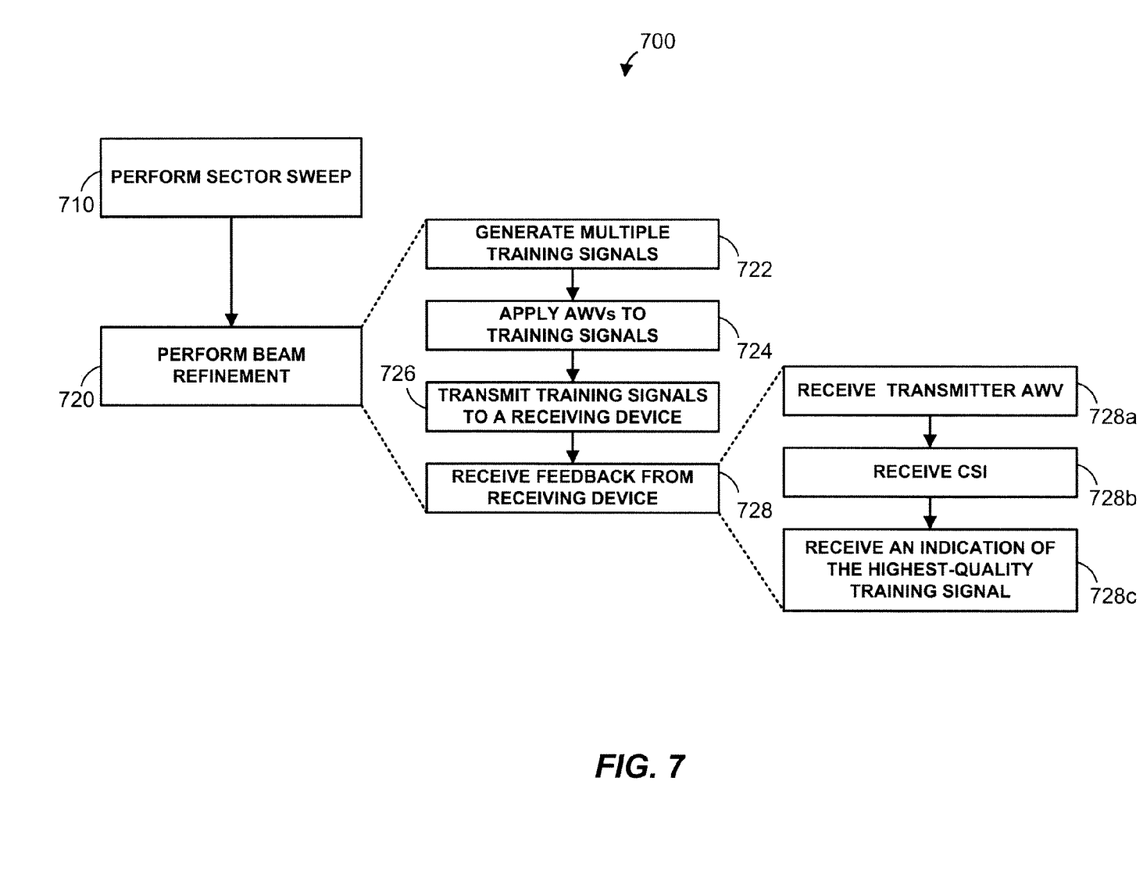
FIG. 7 is a flow diagram illustrating a beamforming method that may be implemented on a transmitting device.
Figure 8:
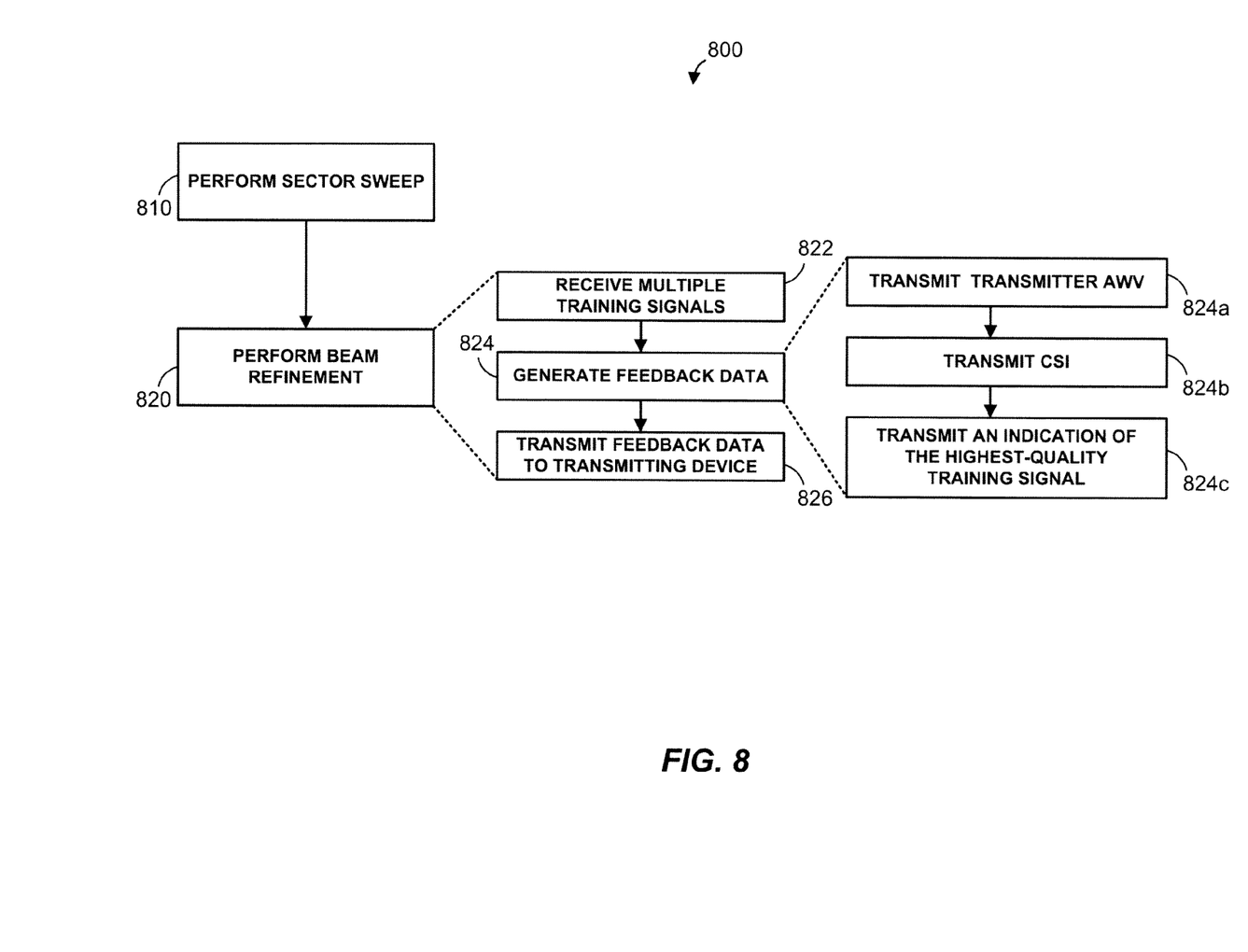
FIG. 8 is a flow diagram illustrating a beamforming method that may be implemented on a receiving device.

FIGS. 7-8 are flow diagrams illustrating several example methods that a receiving device (such as the receiving device illustrated in FIG. 4) and/or a transmitting device (such as the transmitting device 512 illustrated in FIG. 5) implements, in various embodiments, using hardware, firmware instructions implemented on a processor, software instructions implemented on a processor, or any combination thereof to support efficient digital beamforming techniques discussed herein. The various blocks illustrated in these flow diagrams can be implemented by various components illustrated in FIGS. 4 and 5 in any suitable manner. Thus, it will be appreciated that FIGS. 4 and 5 illustrate specific arrangements of components that implement particular blocks of FIGS. 7-8 by way of example only.

FIG. 7 is a flow diagram illustrating a beamforming method 700 that is implemented on a transmitting device, according to an embodiment. The transmitting device first performs a vector sweep to identify a (typically wide) sector in which a signal from the transmitting device is received by the receiver with the best quality (e.g., highest power, highest signal-to-noise ratio, lowest bit error rate, lowest packet error rate, etc.) (block 710). Example techniques for performing a vector sweep are described in commonly-owned, co-pending U.S. patent application Ser. No. 12/548,393, filed on Aug. 26, 2009, and entitled "Beamforming by Sector Sweeping."

The transmitting device then performs beam refinement (block 720). During beam refinement, the transmitting device partitions the identified sector into multiple smaller sub-sectors and sweeps through these sub-sectors to identify a more specific direction in which the antenna array should be steered to maximize power. Of course, the transmitting device can further refine sector sweeping during as many stages as desired.

As described above, during beam refinement, the transmitting device uses the beamforming controller to generate multiple training signals (block 722), apply transmitter AWVs to each signal (block 724) and transmit the training signals to the receiving device via multiple antennas (block 726). The transmitting device then uses the feedback processing unit to receive, from the receiving device, feedback data (block 728), including, for example, a transmitter AWV, e.g., v(i) for use with the antennas (block 728a), channel state information (CSI), e.g., Ht, descriptive of the communication channel (block 728b), an indication of which of the multiple training signals is associated with a highest quality (block 728c), or a combination thereof.

Similarly, FIG. 8 is a flow diagram illustrating a beamforming method 800 that is implemented on a receiving device, according to an embodiment. The receiving device first performs a vector sweep to identify a (typically wide) sector in which a signal from the transmitting device is received with the best quality (e.g., highest power, highest signal-to-noise ratio, lowest bit error rate, lowest packet error rate, etc.) (block 810). The receiving device then performs beam refinement (block 820). During beam refinement, the receiving device partitions the identified sector into multiple smaller sub-sectors and sweeps through these sub-sectors to identify a more specific direction in which the antenna array should be steered to maximize power. Of course, the receiving device can further refine sector sweeping during as many stages as desired.

As described above, during beam refinement, the receiving device receives multiple training signals via multiple transmit antennas (block 822) from the transmitting device. The receiving device then uses the feedback generator to generate feedback data (block 824) and transmits the feedback data to the transmitting device (block 826). The transmitted feedback data includes, for example, a transmitter AWV, e.g., v(i) for use with the antennas (block 824a), channel state information (CSI), e.g., Ht, descriptive of the communication channel (block 824b), an indication of which of the multiple transmit training signals is associated with a highest quality (block 824b), or a combination thereof.

At least some of the various blocks in FIGS. 1A-1C, 4-5, 7, and 8, and other operations and techniques described above may be implemented in hardware, a processor executing firmware instructions, a processor executing software instructions, or any combination thereof. When implemented in a processor executing firmware or software instructions, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for beamforming in a communication system, the method comprising:
    generating a first plurality of training signals to be transmitted via a plurality of antennas over a communication channel, including applying a different one of a plurality of antenna weight vectors (AWVs) to each of the plurality of training signals;
    receiving feedback generated using the first plurality of training signals, wherein the feedback includes at least one of:
        (i) a transmitter AWV for use with the plurality of antennas, and
        (ii) channel state information (CSI) descriptive of the communication channel; and
    generating a second plurality of training signals to be transmitted using a single AWV, wherein generating the second plurality of training signals is associated with a certain iteration of a beam refinement procedure, wherein the single AWV is generated during a beamforming procedure performed prior to the certain iteration of the beam refinement procedure, and wherein the beamforming procedure is one of (i) a sector sweeping procedure or (ii) a previous iteration of the beam refinement procedure.

2. The method of claim 1, wherein the feedback further includes an indication of which of the plurality of training signals is associated with a highest quality.

3. The method of claim 1, wherein each of the first plurality of training signals is transmitted as a respective field in a beamforming refinement packet (BRP).

4. The method of claim 1, wherein each of the plurality of AWVs is a respective base vector of a unitary matrix.

5. The method of claim 4, wherein the unitary matrix is a first matrix; and wherein each of the first plurality of training signals is received using a respective base vector of a second unitary matrix.

6. The method of claim 1, further comprising:
    transmitting a third plurality of training signals via the plurality of antennas over the communication channel, including
        applying a different AWV, selected in view of the feedback, to each of the third plurality of training signals.

7. The method of claim 1, wherein generating the first plurality of training signals includes specifying the respective AWV in each of the first plurality of training signals.

8. A method for beamforming in a communication system, comprising:
    receiving a plurality of training signals transmitted from a transmitting device over a communication channel, wherein each of the plurality of training signals corresponds to a different transmit antenna weight vector (AWV);
    generating feedback to be transmitted to the transmitting device using the plurality of training signals, wherein the feedback includes (i) an indication of which of the plurality of training signals is associated with a highest quality, and (ii) at least one of:
        (a) a transmitter AWV for use by the transmitting device; and
        (b) channel state information (CSI) descriptive of the communication channel.

9. The method of claim 8, wherein the plurality of training signals is a first plurality of training signals; the method further comprising:
    receiving a second plurality of training signals via a plurality of antennas, including applying a different one of a plurality of AWVs to the plurality of antennas as each of the second plurality of training signals is received, wherein the second plurality of training signals is transmitted using a single transmit AWV; and
    generating a receiver AWV using the second plurality of training signals, the single transmit AWV, and the plurality of AWVs.

10. The method of claim 9, wherein each of the plurality of AWVs is a respective base vector of a unitary matrix.

11. The method of claim 9, wherein generating the receiver AWV includes applying one of:
    cophasing;
    codebook selection; and
    singular value decomposition (SVD).

12. The method of claim 8, wherein each of the plurality of training signals is received as a respective field in a beamforming refinement packet (BRP).

13. An apparatus comprising:
    a beamforming controller configured to generate (i) a first plurality of training signals to be transmitted via a plurality of antennas over a communication channel, including applying a different one of a plurality of antenna weight vectors (AWVs) to each of the plurality of training signals and (ii) a second plurality of training signals to be transmitted using a single AWV, wherein the second plurality of training signals is associated with a certain iteration of a beam refinement procedure, wherein the single AWV is generated during a beamforming procedure performed prior to the certain iteration of a beam refinement procedure, and wherein the beamforming procedure is one of a sector sweeping procedure or a previous iteration of the beam refinement procedure; and
    a feedback processing unit configured to receive feedback generated using the first plurality of training signals, wherein the feedback includes at least one of:
        (i) a transmitter AWV for use with the plurality of antennas, and
        (ii) channel state information (CSI) descriptive of the communication channel.

14. The apparatus of claim 13, wherein the feedback further includes an indication of which of the plurality of training signals is associated with a highest quality.

15. The apparatus of claim 13, wherein each of the plurality of training signals is transmitted as a respective field in a beamforming refinement packet (BRP).

* * * * *